United States Patent
Bansemir et al.

(10) Patent No.: US 6,286,782 B1
(45) Date of Patent: Sep. 11, 2001

(54) APPARATUS AND METHOD FOR REDUCING VIBRATIONS OF A STRUCTURE PARTICULARLY A HELICOPTER

(75) Inventors: Horst Bansemir, Munich; Bernd Bongers, Kirchheim, both of (DE)

(73) Assignee: Eurocopter Deutschland GmbH, Munich (DE)

( * ) Notice: Subject to any disclaimer, the term of this patent is extended or adjusted under 35 U.S.C. 154(b) by 0 days.

(21) Appl. No.: 09/184,548

(22) Filed: Nov. 2, 1998

(30) Foreign Application Priority Data

Nov. 4, 1997 (DE) .............................. 197 48 707

(51) Int. Cl.$^7$ ................................................. B64C 27/00
(52) U.S. Cl. .................................... 244/17.11; 244/17.27; 244/75 A; 188/379; 248/564
(58) Field of Search ........................... 244/75 A, 17.11, 244/17.27, 54, 177 R, 119, 564, 612, 618, 629, 635; 188/378–380; 267/136–140

(56) References Cited

U.S. PATENT DOCUMENTS

| | | | |
|---|---|---|---|
| 3,502,290 | * | 3/1970 | Legrand et al. ............... 244/17.27 |
| 3,845,917 | * | 11/1974 | Drees ............................. 244/17.27 |
| 4,042,070 | * | 8/1977 | Flannelly ...................... 244/17.27 |
| 4,683,520 | * | 7/1987 | Grassens et al. ............... 248/564 |
| 5,180,147 | * | 1/1993 | Anderson et al. .............. 188/379 |
| 5,775,472 | * | 7/1998 | Osterberg et al. .............. 188/378 |
| 5,775,637 | * | 7/1998 | Vuillet et al. ................. 244/17.11 |

FOREIGN PATENT DOCUMENTS

| | | |
|---|---|---|
| 4340007 | 1/1994 | (DE) . |
| 19540927 | 5/1997 | (DE) . |

* cited by examiner

Primary Examiner—Galen L. Barefoot
(74) Attorney, Agent, or Firm—Ladas & Parry

(57) ABSTRACT

Apparatus for damping vibrations of a structure such as the air frame of a helicopter wherein a spring system (1), which has an elastic wall structure forming a tube-shaped hollow body supports a weighted vibrating object (23). At least one region of the wall structure is constructed to be elastically deformable in its plane, with a spring stiffness, tuned to the frequency of the vibration to be damped. The wall structure is formed by several planar spring elements (11a, 11b, 11c, 11d), each of which can be elastically deformed in its plane by an arrangement of longitudinal strips (110a, 110b, 111a, 111b) and connecting cross pieces (120a, 120b, 121a, 121b). A battery of the helicopter can be used as the vibrating weight (23). The vibration damper containing the battery is installed at a location on the helicopter where clear structural vibrations occur in two directions perpendicular to each other and wherein the vibration damper is tuned to the vibrations frequencies in both directions.

20 Claims, 6 Drawing Sheets

APPARATUS AND METHOD FOR REDUCING VIBRATIONS OF A STRUCTURE PARTICULARLY A HELICOPTER

FIELD OF THE INVENTION

The present invention relates to a device for the reduction of vibrations of a structure, particularly a helicopter, as well as to a method for the reduction of vibrations of a structure, for example, tail-shake vibrations of a helicopter.

BACKGROUND

The air frame structures of helicopters are subject to significant vibrations. These are caused, for example, by air flow along the surface of the helicopter. In the case of so-called tail-shake vibrations, the rear end of the helicopter vibrates both in the vertical as well as in the horizontal directions. In particular, the first natural bending characteristics in the vertical and horizontal directions are responsible for cabin vibrations at the seat of the pilot and they greatly influence these vibrations. In order to reduce tail-shake vibrations, vibration dampers are conventionally utilized. These vibration dampers are essentially comprised of weights and springs.

In the conventional vibration dampers, the problem exists that great additional weight is necessary which significantly increases the total weight of the helicopter. In addition, these dampers require substantial space for their installation which is not always available at the location where they provide an optimal damping action. In addition, expensive fastening devices are necessary for the springs and the weights at various places in the helicopter.

SUMMARY OF THE INVENTION

It is thus an object of the present invention to overcome the above disadvantages of the conventional damping devices and provide a damping device for the reduction of vibrations of a structure which has less weight and requires a minimum space and which can be easily produced and by which vibrations are effectively reduced.

Another object is to provide a method by which vibrations are reduced in structures, particularly in helicopters, both effectively and with savings in weight and space.

The above and further objects are achieved by a device according to the invention for the reduction of vibrations of a structure, particularly a helicopter, which comprises:

a spring system having an elastic wall structure defining a hollow body; and a weighted vibration object which is attached in the hollow body; and wherein at least one region of the wall structure is elastically deformable in the plane of its wall surface and has a spring stiffness, which is tuned to the frequency of vibration of the structure to be reduced.

It is possible in this way to support a weighted vibrating object in a simple way, so that in can produce elastic movements relative to its surrounding structure, such that the vibrating object is nevertheless supported permanently and stably. Such a spring structure saves space, can be easily produced, and makes possible a good connection to the structure, while providing a good adaptation to the vibrations to be reduced. Due to the configuration of the spring system as a hollow body, the vibrating object, for example, in the form of a block or cuboid structure, can be easily connected to the surrounding structure, so that the vibrations of the structure can be effectively reduced.

Advantageously, the elastic wall structure comprises a plurality of planar spring elements, which together form the hollow body. Preferably, each of the planar elements can be elastically deformed in its plane.

According to the invention, a battery, such as, a starter battery of the helicopter can be used as the vibrating object. In this way, the need for additional weight is eliminated. Advantageously, the device has two degrees of freedom of displacement, in order to reduce vibrations of the structure in two directions. In this way, the first natural bending frequency of the structure in the vertical and horizontal directions can be particularly reduced.

In the device, four spring elements can be arranged in such a way that two spring elements lie opposite each other in pairs. The spring stiffness of the spring elements of one pair preferably differs slightly from the spring stiffness of the spring elements of the other pair. In this way, vibrations of air frame structures with different frequencies in different directions can be effectively reduced. The weight M of the vibrating object may be between 10 and 50 kg, preferably between 20 and 30 kg, and particularly approximately 26 to 27 kg. This makes possible a good adaptation to the required frequencies to be damped. The spring system is preferably joined with the vibrating object by eight connections and advantageously it has eight other connections for attachment to the surrounding structure. The material and/or the length of the spring elements are preferably selected such that the stiffness and the spring path are adapted to the vibrations to be reduced. Therefore, an optimal adaptation and connection to the structure can be achieved by simple construction means.

Advantageously, the spring elements or wall structure are manufactured from a fiber composite material, for example, an isotropic or quasi-isotropic structure. This makes construction easy while providing high strength.

Advantageously, each of the spring elements is in the form of a flat, rectangular flat frame with a pair of first longitudinal elements or strips and a pair of first cross pieces, at least one of the first longitudinal elements being connected, preferably at its center, to a second cross piece which extends toward the outside. In this way, the individual spring elements can undergo elastic deformation in the plane of the frame. Each of the spring elements can have a second longitudinal element, which extends parallel to the first longitudinal elements and the first and second longitudinal elements are connected at their respective centers by the second cross piece. In this way, tensile and compressive stresses in the direction of the cross pieces are resisted at the centers of the longitudinal elements and lead to their elastic deformation. Preferably, the planar spring elements have a rectangular outer configuration, and they can be joined with the vibrating object at the first cross pieces. The connection of the spring elements to the surrounding structure is preferably made at the four outer corners of the spring elements.

According to a further aspect of the invention, a method is provided for the reduction of vibrations of a structure, particularly tail-shake vibrations of a helicopter, in which a battery of the helicopter is used as a vibration damper. Preferably, the battery is supported in a spring system, and the spring system is mounted, with the battery, at a location in the structure at which a first natural bending of the structure takes place.

According to the above further aspect of the invention, the method for the reduction of vibrations of a structure, includes the steps of:

supporting a weighted vibratable object in a spring system having two degrees of freedom of elastic deformation, the spring system being formed of planar spring elements, each of which can be deformed elastically in its plane;

fastening the spring system in a structure whose vibration is to be reduced, particularly a helicopter, at a location, at which vibratory motion of the structure occurs in two directions perpendicular to one another;

the spring system being aligned such that the elasticity of the spring elements operates in both directions of vibration of the structure.

In particular, tail-shake vibrations of helicopters can be effectively reduced by the method of the invention.

The spring system is preferably fastened in the helicopter at a place where the natural vibratory bending of the helicopter frame takes place in the horizontal and vertical directions. Vibrations with a frequency of 3 to 10 Hz, preferably 5 to 10Hz, and particularly, 5.6 Hz to 6.0 Hz are reduced according to the method.

BRIEF DESCRIPTION OF THE DRAWING

The method and device according to the invention for the reduction of vibrations are described hereafter with reference to the drawing, in which.

DETAILED DESCRIPTION

Figure 1:
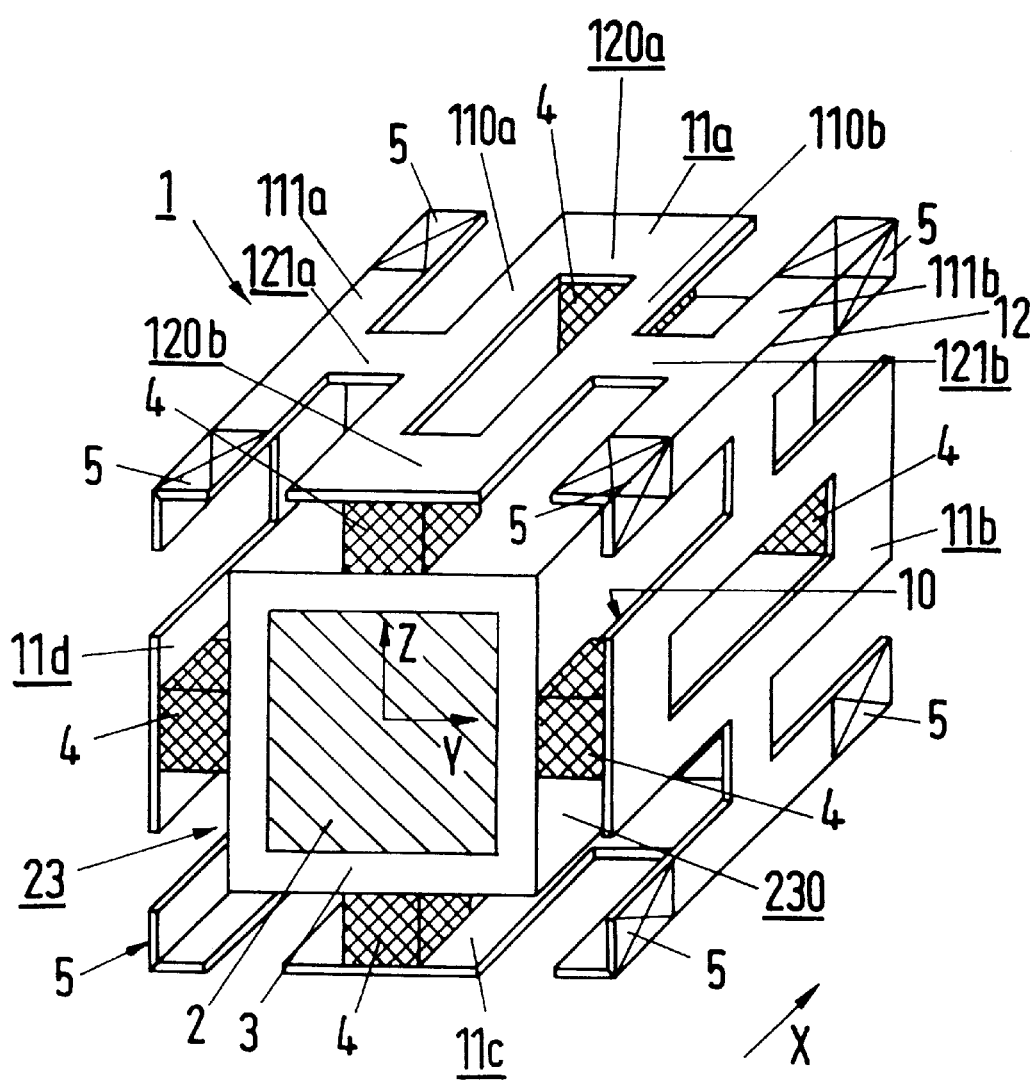
FIG. 1 is a perspective view of a preferred embodiment of the device according to the invention.

FIG. 1 shows a preferred embodiment of the device according to the invention for the reduction of vibrations in a surrounding structure. The device has a plurality of spring elements 11a, 11b, 11c, 11d arranged to form a hollow spring system 1. Each of the spring elements has a flat, planar shape and includes a hollow rectangular frame comprising a plurality of longitudinal strips 110a, 110b, and cross pieces 120a, 120b. The longitudinal strips 110a and 110b are connected at their ends to cross pieces 120a and 120b to form the hollow, rectangular frame. Further cross pieces 121a and 121b are respectively connected to the center of the longitudinal strips 110a and 110b and extend outwards to connect to the centers of additional longitudinal strips 111a and 111b. The longitudinal strips and the cross pieces can be formed by punching out recesses in a flat plate. The outer configuration of the individual spring elements 11a, 11b, 11c, 11d is rectangular and adjoining spring elements are joined together at edges 12 at respective outer longitudinal strips 111a, 111b. Spring elements that adjoin one another are aligned at right angles to one another.

Spring elements 11a, 11b, 11c, 11d collectively form a hollow body or unit with a hollow interior space, in which a battery 2 of the helicopter is attached as a part of a weighted vibrating object 23. Battery 2 is attached inside a tubular battery-supporting structure 3 in order to facilitate easy removal or installation of the battery. Battery 2 and battery-supporting structure 3 together form the vibrating object 23. The tubular battery-supporting structure 3 is of parallelepiped-shape and it is installed in the center of the hollow unit by connection with the individual spring elements 11a, 11b, 11c, 11d by means of eight parallelepiped-shaped connection elements 4. The connection elements 4 are each joined with spring elements 11a, 11b, 11c, 11d at the inner surfaces of outer cross pieces 120a, 120b so as to be inside the hollow unit. The parallelepiped-shaped vibrating object 23 is connected to each spring element 11a, 11b, 11c, 11d by means of two connection elements 4, such that side walls 10 of the hollow unit formed by the spring elements are each aligned parallel to the adjacent side walls 230 of vibrating object 23.

The tube-shaped, i.e., parallelepiped-shaped spring structure, which is formed by the four outside walls, has eight connection elements 5 at its corners, for connection to the air frame structure of the helicopter. The elements 5 can be connected by gluing, welding, screw connections or the like to the air frame of the helicopter. The connection elements 4 are similarly connected to the battery supporting structure 3 and the spring elements.

Vibrating object 23 can undergo elastic deformation in two directions Z, Y, due to the elastic properties of the spring system and the mounting of the vibrating object 23 in the hollow unit. In this way, motion in one plane, i.e., with two degrees of freedom, can be produced. In the direction of the longitudinal axis of the parallelepiped-shaped hollow unit, i.e., in the X direction, vibrating object 23 is held such that no deflection can occur in this direction. In the case of a deflection of vibration object 23 in one direction, for example, in the Z direction, the spring stiffness of the two spring elements 11b and 11d, which are aligned parallel to this direction, in this case, in the Z direction, is decisive for the restoring force.

In the case of a lateral or horizontal deformation, i.e., in the Y direction, the spring stiffness of spring elements 11a, 11c in the Y direction is decisive for the restoring force. The planar spring elements disposed perpendicular to the direction of the deformation, in this case spring elements 11b, 11d, react weakly in the direction of the deformation, in order to make the deformation possible.

Figure 2A:
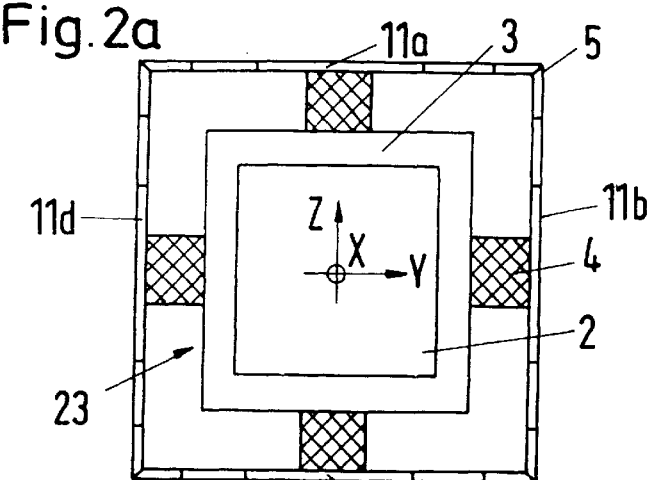
FIG. 2a is a front view of the device shown in FIG. 1.
Figure 2B:
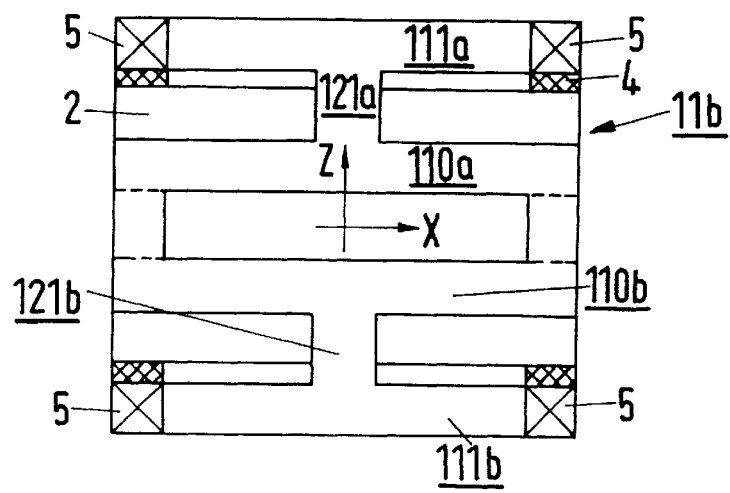
FIG. 2b is a side view of the device shown in FIG. 1.
Figure 2C:
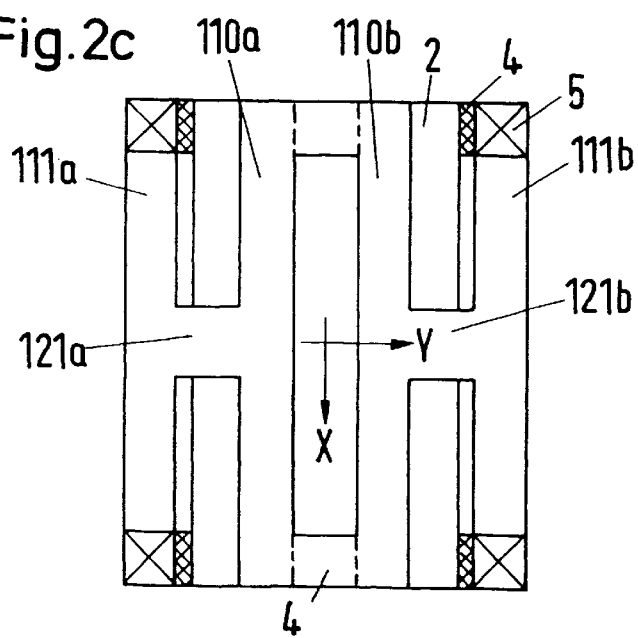
FIG. 2c is a view from below of the device shown in FIG. 1.

Views of the device according to the invention are shown from various sides in FIGS. 2a to 2c. FIG. 2a shows a front view of spring system 1 with spring elements 11a, 11b, 11c, 11d and vibrating object 23. A deflection of the vibrating unit in the Z direction and the Y direction, which lie in the plane of the drawing, can be produced. In the X direction, i.e., perpendicular to the drawing plane, the system is rigid, i.e., a high resisting force or stiffness is provided.

FIG. 2b shows a view of the tube-shaped spring structure shown in FIG. 1 from the right side. The plate-shaped spring element 11b has, at its four corner regions, connection elements 5 for connection to the surrounding structure. Connection elements 5 are formed as angle members and they also serve to secure adjacent spring elements together.

The spring structure of FIG. 1 is shown from below in FIG. 2c. An elastic motion or deflection of battery 2 can occur in the lateral or horizontal direction, i.e., in the Y direction and in the vertical direction, i.e., in the Z direction (perpendicular to the drawing plane). In the direction of the longitudinal axis of the hollow unit, i.e., in the X direction substantially no deflection or only a slight deflection is possible.

Figure 3:
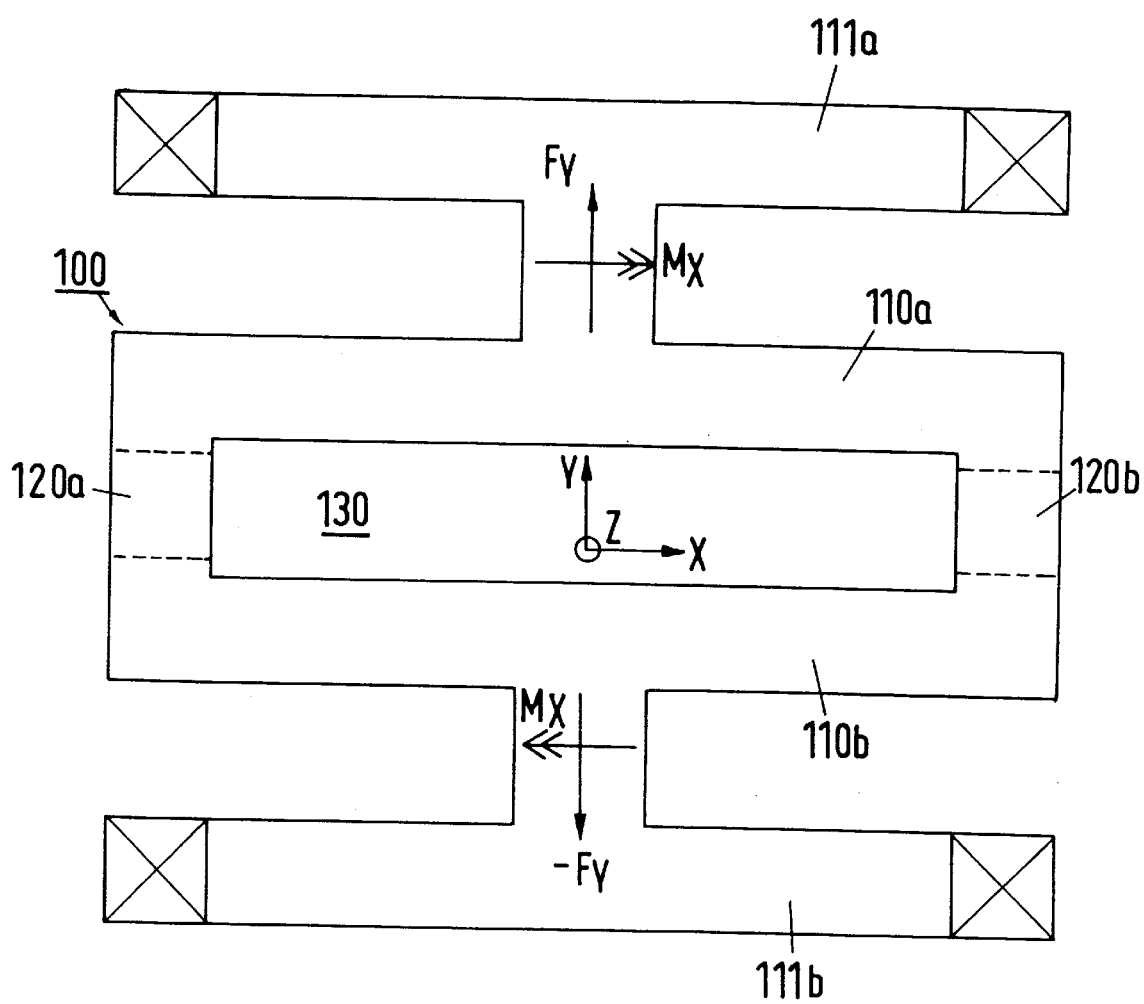
FIG. 3 is a plan view of a spring element of the device according to the invention.

FIG. 3 shows one of spring elements 11a, 11b, 11c, 11d of the spring system. The flat, rectangular longitudinal strips 110a, 110b and cross pieces 120a, 120b collectively form a flat frame 100, in the center of which is a longitudinal slot 130. The spring element has a defined usable spring stiffness in the Y direction, in the plane of the frame, and a weakness in the Z direction, i.e., in the direction perpendicular to its planar surface. In the case of a cross bending movement $M_x$, which is represented in the drawing according to the right-hand rule by the double-headed arrow, a weak bending of the spring element in the Z direction is produced. In the case of a force $F_y$ operating in the Y direction, a bending of longitudinal pieces 110a, 110b in the Y direction (or opposite thereto) is produced. By the suitable selection of material, preferably fiber composite materials with isotropic or quasiisotropic structure, and suitable selection of the lengths and widths of the pieces of spring elements 11a, 11b, 11c, 11d, the spring path and the stiffness are adapted to the particular requirements.

Figure 4:
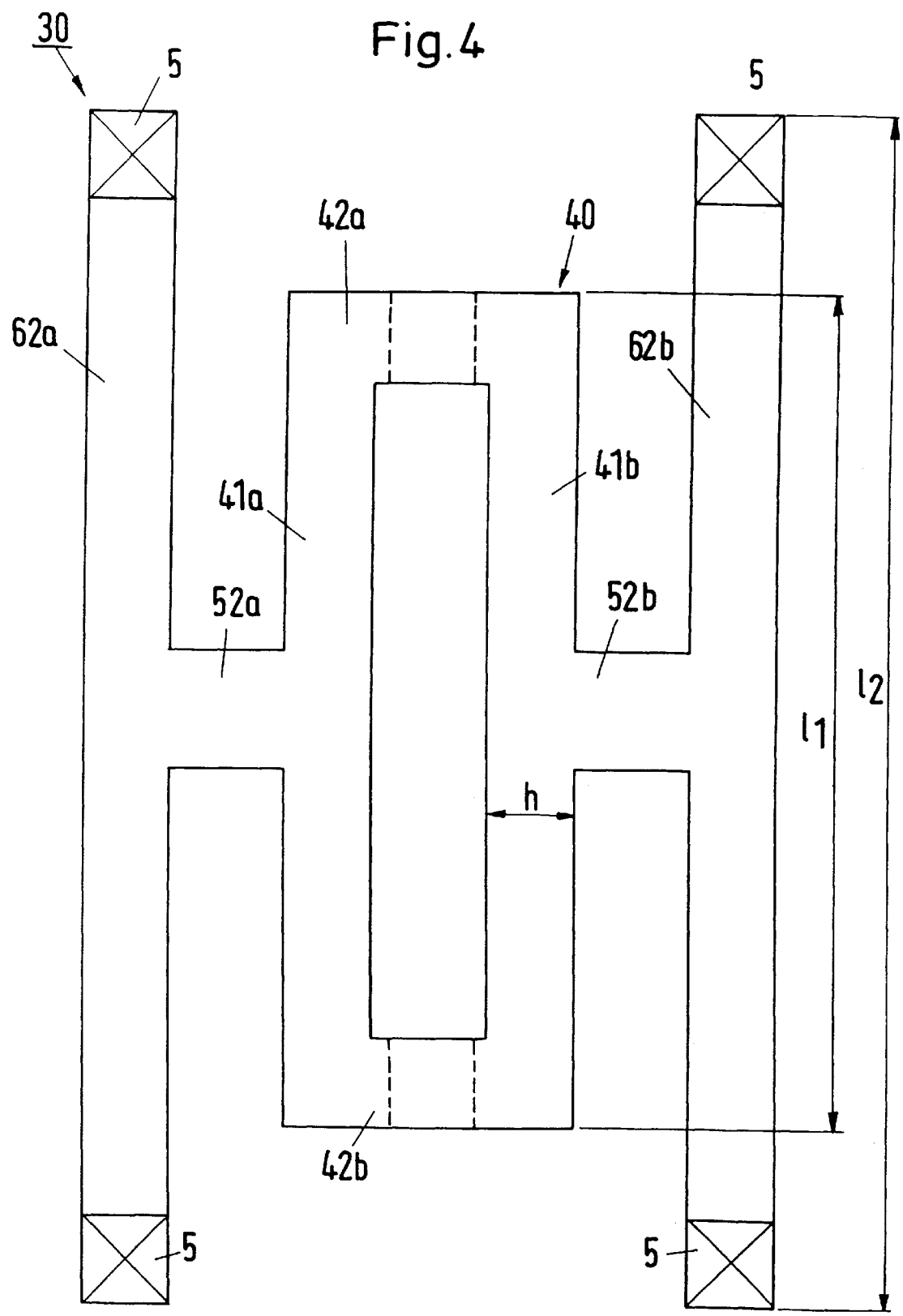
FIG. 4 is a plan view of another configuration of a spring element of the device according to the invention.

FIG. 4 shows another configuration of the spring element of the spring system according to the invention. As in the previously described embodiment, a flat frame 40 is formed in the center of the planar spring element 30, the frame 40 being formed by two parallel longitudinal strips, 41a, 41b, which are joined at their ends by cross pieces 42a, 42b extending perpendicularly to the longitudinal strips. On the outer edges of longitudinal strips 41a, 41b, other cross pieces 52a, 52b are arranged, which extend outwardly from the center of the respective longitudinal strips 41a, 41b. The two cross pieces 52a, 52b are connected to longitudinal strips 62a, 62b, which extend at the outside of frame 40 parallel to the first longitudinal strips 41a, 41b. Longitudinal strips 41a, 41b of frame 40 have a width h and a length $l_1$. The longitudinal strips 62a, 62b have a length of $l_2$. By suitable selection of the geometric parameters h, $l_1$, $l_2$ and the material, the spring stiffness can be varied and can be optimally adapted to the vibration to be reduced. In the embodiment shown in FIG. 4, length $l_1$ of frame 40 is less than the total length of $l_2$ of spring element 30.

Figure 5:
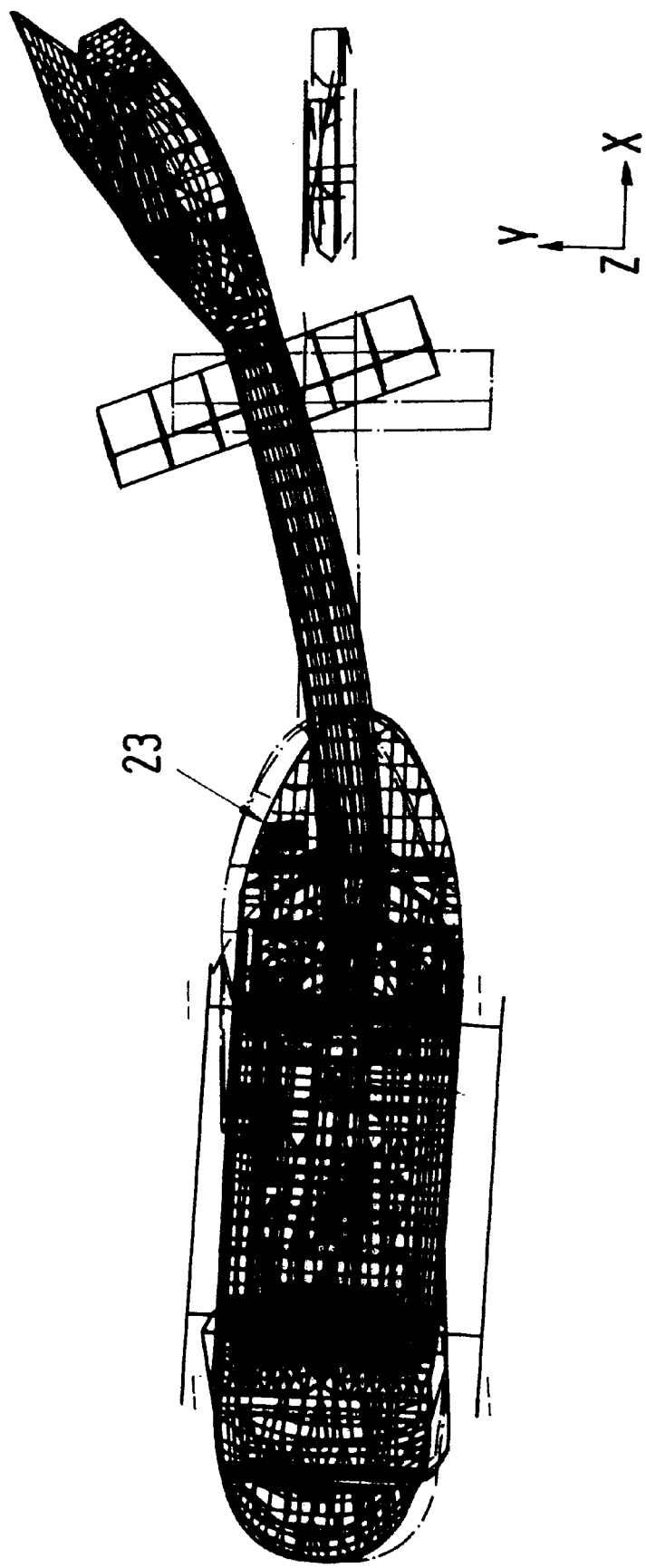
FIG. 5 is a schematic representation of the air frame of a helicopter from above, which shows a first natural bending form of the helicopter in the lateral or horizontal direction.

FIG. 5 shows the first natural bending form of the air frame of a helicopter in the lateral or horizontal direction in an exaggerated manner. The vibration frequency of the air frame in the lateral direction is approximately 6.0 Hz as measured in several helicopters. The battery of the helicopter is mounted as vibrating object 23 in the above-described spring system according to the invention at a place where there are clear structural movements in the lateral direction.

Figure 6:
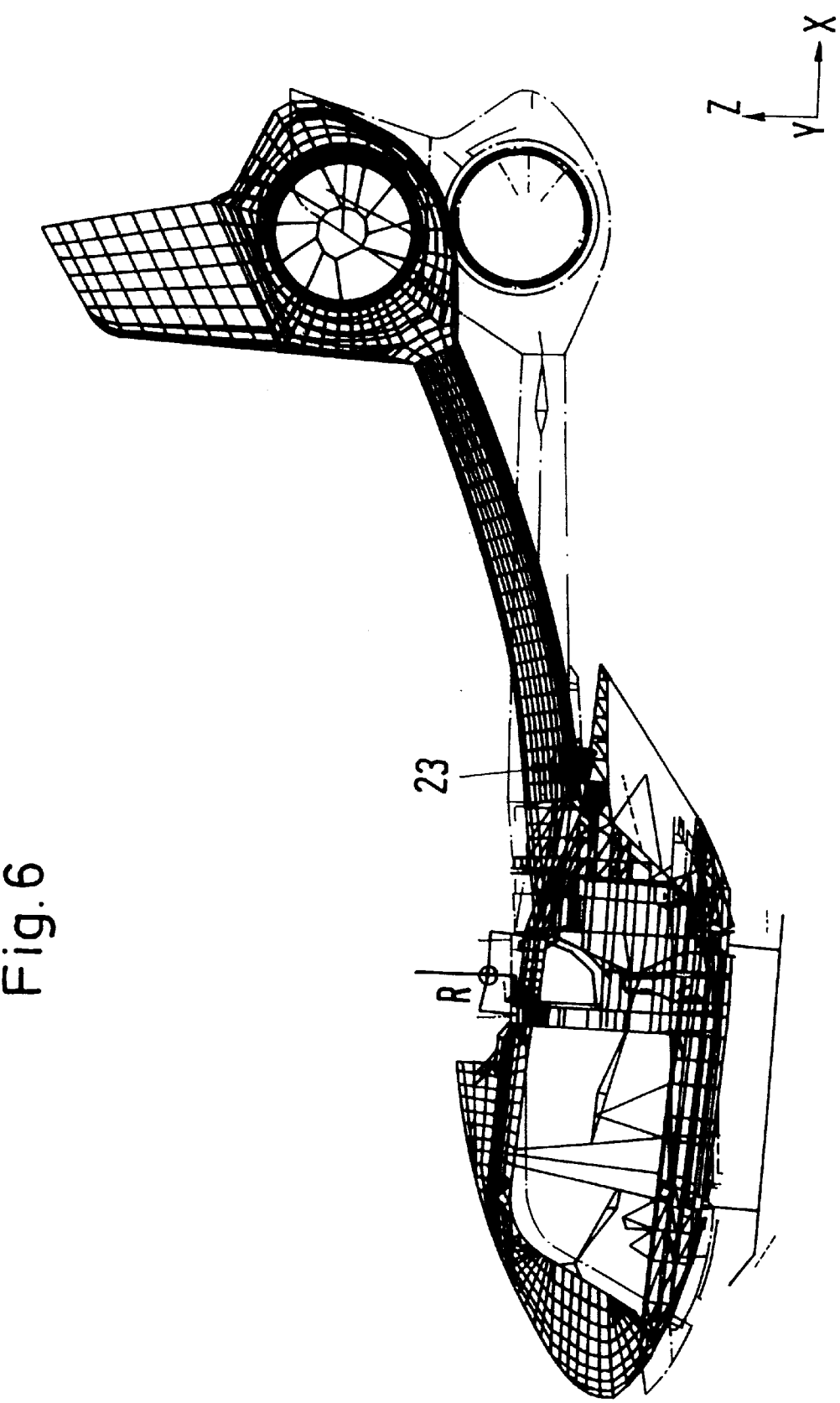
FIG. 6 is a schematic representation of the air frame of a helicopter in a side view, which show a first natural bending form of the helicopter in the vertical direction.

FIG. 6 shows a first natural bending form of the air frame of the helicopter in the vertical direction in exaggerated manner. The spring system according to the invention is provided with battery 2 as the vibrating object 23. The vibration of the air frame in the vertical direction (Z direction) has a somewhat lower frequency than that in the lateral direction (Y direction). In the case of the helicopter shown herein, the frequency of vibration in the vertical direction is 5.6 Hz, whereas it is 6.0 Hz in the lateral direction.

The site of incorporation of the vibration damper according to the invention is at a place, where clear structural movements are present in both the lateral as well as the vertical directions. Thus, the device according to the invention for reducing vibrations of the air frame structure of the helicopter is at the vibration waves of the first natural bending forms. Battery 2 of the helicopter is used as the vibrating object or vibrating damper, and the battery has a weight of approximately 26 to 27 kg. The helicopter battery can be configured structurally as a vibration damper in the Y and Z directions by the device according to the invention, whereby space and weight are minimized. By suitable selection of the above-discussed geometric parameters of the spring elements and the materials used, the spring stiffness and the intrinsic frequency (resonant frequency) can be optimally tuned to the natural vibration frequency of the air frame structure so that the vibrating weight can damp the vibrations of the air frame structure.

In order to make possible an adaptation of the slightly different vibration frequencies in the vertical and lateral directions, the tube-shaped spring structure in yet another embodiment is comprised of two pairs of side walls lying opposite one another, in which the spring elements of the first pair have a slightly different stiffness relative to the spring elements of the second pair. Thus, one pair of side walls is comprised of the spring elements shown in FIG. 3 and the other pair of side walls is comprised of the spring elements shown in FIG. 4.

The construction of a space-saving, spatially rigidly connected battery-vibration damper that is easily produced and is associated with small additional weight can be accomplished according to the invention by means of the tube-shaped spring structure and the high weight of the battery.

Although the invention is disclosed with reference to particular embodiments thereof, it will become apparent to those skilled in the art that numerous modifications and variations can be made which will fall within the scope and spirit of the invention as defined by the attached claims.

What is claimed is:

1. Apparatus for reducing vibration of a structure comprising:
    a spring system having an elastic wall structure including two pairs of side walls opposite one another and defining a hollow body,
    a weighted object supported in a hollow space in said hollow body,
    each of said side walls comprising a planar spring element which is elastically deformable in its plane and has a spring stiffness tuned to a frequency of vibration of the structure to reduce said vibration.

2. Apparatus as claimed in claim 1, wherein said vibratable object comprises a vehicle battery adapted for use in said structure.

3. Apparatus as claimed in claim 1, wherein said wall structure provides two degrees of freedom for reduction of vibrations of the structure in two directions.

4. Apparatus as claimed in claim 1, wherein one pair of said pairs of side walls has a spring stiffness which differs from the spring stiffness of the other pair.

5. Apparatus as claimed in claim 1, wherein the weight of the vibratable object is between 10 to 50 kg.

6. Apparatus as claimed in claim 1, wherein the weight of the vibratable object is between 26 to 27 kg.

7. Apparatus as claimed in claim 4, comprising eight connectors connecting said vibratable object to said spring elements and eight further connectors connecting said spring elements to said structure.

8. Apparatus as claimed in claim 4, wherein said spring elements have respective lengths and composition of materials which are varied to provide respective spring stiffness and spring direction to oppose frequency of vibration of said structure.

9. Apparatus as claimed in claim 8, wherein said material of said spring elements comprises a fiber composite having isotropic or quasi-isotropic structure.

10. Apparatus as claimed in claim 1, wherein each planar spring element has a rectangular configuration including a pair of first longitudinal strips and a pair of first cross pieces connecting said longitudinal strips together at respective ends thereof, and a second cross piece connected to one of said longitudinal strips and extending outwardly therefrom.

11. Apparatus as claimed in claim 10, wherein each planar spring element further includes a second longitudinal strip, said first and second longitudinal strips extending parallel to one another, said second cross piece being connected to said one of said longitudinal strips and to said second longitudinal strip at respective centers of said longitudinal strips.

12. Apparatus as claimed in claim 11, wherein said planar spring elements form a parallelepiped configuration for said hollow body, each said planar spring element further comprising a further second cross piece connected to the other of said first longitudinal strips and a further second longitudinal strip connected to said further second cross piece, two connectors joining each planar spring element to said vibratable body, said two connectors respectively connecting said pair of first cross pieces of each frame to said vibratable body, said second longitudinal strip of one of said planar spring elements adjoining a second longitudinal strip of an adjacent planar spring element to form corners thereat and two corner connectors are provided at each of said corners to connect the adjoining said second longitudinal strips together.

13. A method of reducing tail-shake vibrations of a helicopter comprising:

forming a vibration damper to dampen the tail-shake vibrations of the helicopter, the vibration damper being formed as a hollow spring system in which a vibrating weight is mounted, installing the vibration damper at a location in the helicopter to achieve the vibration damping, and providing in said vibration damper, as said vibrating weight to oppose the tail-shake vibrations, a battery of said helicopter, said vibration damper being installed in the helicopter at said location where natural vibratory bending of a frame of the helicopter takes place during tail-shake vibrations.

14. A method as claimed in claim 13, wherein said hollow spring system provides two degrees of freedom respectively corresponding to two perpendicular directions of vibration of the air frame and tuned to the natural frequency of vibration in said two directions.

15. A method as claimed in claim 14, comprising forming said hollow spring system of flat spring elements each deformable in one of said two degrees of freedom.

16. A method as claimed in claim 15, wherein the two degrees of freedom are perpendicular to one another.

17. A method as claimed in claim 16, comprising providing each of the spring elements with respective stiffness to obtain a desired natural frequency of vibration in each direction of freedom.

18. A method as claimed in claim 17, comprising supporting said vibration damper in said helicopter so that one degree of freedom is in a horizontal direction of tail-shake vibration of the air frame of the helicopter and the second degree of freedom is in a vertical direction of tail-shake vibration of the air frame of the helicopter.

19. A method as claimed in claim 18, comprising tuning the natural frequency of vibration of the vibration damper to a frequency of 3 to 10 Hz.

20. A method as claimed in claim 18, comprising tuning the natural frequency of vibration of the vibration damper to a frequency of 5.6 to 6.0 Hz.

* * * * *